United States Patent [19]

Wenzel et al.

[11] 4,206,255

[45] Jun. 3, 1980

[54] COATING COMPOSITIONS BASED ON A MIXTURE OF AQUEOUS POLYURETHANE DISPERSIONS

[75] Inventors: Wolfgang Wenzel, Berg-Gladbach; Schröer, Leverkusen; Manfred Preuss, Hilden; Hans-Joachim Koch, Leverkusen, all of Fed. Rep. of Germany

[73] Assignee: Bayer Aktiengesellschaft, Leverkusen, Fed. Rep. of Germany

[21] Appl. No.: 11,463

[22] Filed: Feb. 12, 1979

[30] Foreign Application Priority Data

Feb. 22, 1978 [DE] Fed. Rep. of Germany ....... 2807479

[51] Int. Cl.² .................. C08J 3/00; B05D 3/02; B32B 27/40
[52] U.S. Cl. .................. 427/393.5; 260/29.2 TN; 428/424.6; 428/904; 521/137; 525/440; 525/457; 525/458
[58] Field of Search ............ 260/29.2 TN; 427/385 B; 521/137; 525/440, 457, 458; 428/425, 904

[56] References Cited

U.S. PATENT DOCUMENTS

| 3,262,805 | 7/1966  | Aoki ................................... 427/270 X |
| 3,479,310 | 11/1969 | Dieterich et al. ............ 260/29.2 TN |
| 3,480,592 | 11/1969 | Dieterich et al. ............. 260/29.2 X |
| 3,905,929 | 9/1975  | Noll ................................. 260/29.2 X |
| 3,920,598 | 11/1975 | Reiff et al. ................... 260/29.2 TN |
| 4,017,493 | 4/1977  | Ferment et al. ...................... 427/257 |
| 4,045,600 | 8/1977  | Williams ............................... 427/379 |
| 4,092,286 | 5/1978  | Noll et al. .................... 260/29.2 TN |

FOREIGN PATENT DOCUMENTS

1769387 5/1968 Fed. Rep. of Germany .
1191260 5/1970 United Kingdom .

*Primary Examiner*—Michael R. Lusignan
*Attorney, Agent, or Firm*—Gene Harsh; Lawrence S. Pope

[57] ABSTRACT

This invention relates to coating compositions based on aqueous polyurethane dispersions and to the use of these coating compositions for the production of top coats or finishes on PVC. The coating compositions according to the invention contain a mixture of two aqueous polyurethane dispersions which have particular chemico-physical properties.

7 Claims, No Drawings

COATING COMPOSITIONS BASED ON A MIXTURE OF AQUEOUS POLYURETHANE DISPERSIONS

BACKGROUND OF THE INVENTION

The production of polyurethane coatings on PVC is already known in principle. Methods of coating PVC using one-component or two-component polyurethane systems dissolved in organic solvents have been described, for example, in U.S. Pat. Nos. 3,262,805; 4,017,493 and 4,045,600. The use of coatings containing solvents, however, has certain practical disadvantages, particularly the fact that for economical and ecological reasons it is necessary to recover the organic solvent after the coating process. There is therefore a general demand for solvent-free coating compositions.

It is known from German Published Patent Application 1,769,387 (British Pat. No. 1,191,260) to bond PVC with aqueous polyurethane dispersions, but these dispersions have not been successful as top coats or finishes on PVC. This is because it has not hitherto been possible to provide products which would both adhere firmly to PVC and meet the high quality standards of the coating industry for top coats and finishes (e.g. high softening point; high mechanical strength; stability to ageing by hydrolysis; low swelling in plasticizers; blocking against migration of the plasticizers in PVC; and pleasant, dry handle).

It has now surprisingly been found that coating compositions which fulfill the above-mentioned requirements can be obtained from aqueous polyurethane dispersions by mixing two different polyurethane dispersions each of which must fulfill different chemico-physical criteria.

SUMMARY OF THE INVENTION

This invention relates to coating compositions based on aqueous, sedimentation-resistant polyurethane dispersions having a solid content below about 60% by weight, which are characterized in that they contain, based on the polyurethane solid content, (A) from about 2 to 90%, preferably from about 5 to 50, % by weight of a polyurethane which:
  (a) contains from about 5 to 100, preferably from about 8 to 40, milliequivalents or pseudo milliequivalents in 100 g of polyurethane solids of anionic and/or cationic groups and/or ethylene oxide units and
  (b) at least about 4% by weight, preferably from about 10 to 65%, and most preferably from about 20 to 50% by weight, based on the polyurethane solid content, of linear alkylene groups having from about 4 to 6 carbon atoms, which polyurethane results in films which
  (c) have a softening point below about 205° C., preferably below about 190° C., and most preferably from about 140° to 180° C. and
  (d) a Shore Hardness A below about 97, preferably from about 30 to 95; and (B) from about 10 to 98, preferably from about 50 to 95% by weight of a polyurethane which contains:
  (a) from about 5 to 30, preferably from about 8 to 20 milliequivalents or pseudo milliequivalents of anionic and/or cationic groups and/or ethylene oxide sequences in 100 g of polyurethane solids and results in films which
  (b) melt above about 210° C., preferably above about 215° C.; and most preferably above about 220° C. and
  (c) have a Shore Hardness D of more than about 50, preferably more than about 55, and most preferably from about 60 to 80.

The instant invention relates to a mixture of components A and B and not to the individual components "per se".

The present invention also relates to a process for the direct coating or reversal coating of cellular or noncellular PVC with polyurethanes, characterized in that the coating compositions according to the present invention are used for producing the coating.

DETAILED DESCRIPTION OF THE INVENTION

The substances used as components A and B in coating compositions according to the present invention may be any aqueous, sedimentation-resistant polyurethane dispersions having a particle size preferably of from about 150 to 400 mµ, providing they fulfill the criteria indicated above. The dispersions generally have a solid content below about 60% by weight, preferably below from about 20 to 50% by weight, and may be prepared by various known processes. Any other known, commercially-available dispersions may, of course, also be used for the present invention, provided they have the properties mentioned above.

Methods for the preparation of stable, aqueous polyurethane dispersions which are suitable according to the invention have been described, for example, in German Pat. No. 1,178,586 (U.S. Pat. Nos. 3,480,592), 1,495,745 (U.S. Pat. No. 3,479,310) and 1,770,068 (U.S. Pat. No. 3,756,992); German Published Patent Applications 2,314,512 (U.S. Pat. Nos. 3,905,929), 2,314,513 (U.S. Pat. Nos. 3,920,598), 2,320,719 (British Pat. Nos. 1,465,572), 2,446,440 and 2,555,534; and by D. Dieterich in "Angewandte Chemie" 82, 53 (1970). The general principle of this process consists of incorporating hydrophilic centers as so-called internal emulsifiers in the chain of a polyurethane or polyurethane-urea macromolecule. The hydrophilic centers used for this purpose may be anionic and/or cationic groups and/or —CH$_2$—CH$_2$—O—sequences. The hydrophilic centers may, in principle, be incorporated in the macromolecule at any stage during the preparation of the polyurethane.

The procedure generally consists of first preparing a prepolymer having isocyanate end groups from a higher molecular weight polyhydroxyl compound, optionally a low molecular weight mono-, di- or triol and an excess of polyisocyanate, and then converting this prepolymer into a polyurethane dispersion by a process accompanied by chain-lengthening, for example, by a process analogous to those described in German Pat. No. 1,495,745 (U.S. Pat. No. 3,479,310), and German Published Patent Applications 1,770,068 (U.S. Pat. No. 3,756,992) and 2,446,440. Both the higher molecular weight polyhydroxyl compound and the low molecular weight alcohol, if used, may contain ionic groups or groups capable of conversion into ionic groups, for example as indicated in German Published Patent Applications 1,770,068 and 2,446,440. Monohydroxyl or dihydroxyl compounds containing ethylene oxide sequences may be incorporated in the macromolecule as hydrophilic segments instead of, or in addition to, the ionically modified high molecular weight and low molecular weight alcohols, as described, for example, in German Published Patent Applications 2,314,512 (U.S. Pat. Nos. 3,905,929), 2,551,094; 2,555,534 and 2,651,506. It would also be possible to synthesize hydrophobic prepolymers (that is to say, without hydrophilic centers) and then convert these into polyurethanes or polyurethane ureas which are dispersible in water by a chain-lengthening reaction, for example using diamines or diols which contain ionic groups (German Published Patent Application 2,035,732).

Any higher molecular weight polyhydroxyl compounds may, in principle, be used for the preparation of component A of the coating compounds according to the present invention. However, care must be taken to ensure that the polyurethane molecule as a whole contains the given minimum quantity of linear alkylene groups having from about 4 to 6 carbon atoms. These alkylene segments may be introduced either through the polyol component (for example, polyesters based on adipic acid and/or hexane diol and/or butane diol) or through the isocyanate component (hexamethylene diisocyanate). The polyol components used for synthesizing the isocyanate prepolymer for the preparation of polyurethane dispersion B are preferably relatively low molecular weight polyesters and/or polyethers (having a molecular weight, $\overline{M}n$, below about 1000, preferably below about 700). These polyesters and polyethers preferably contain aromatic rings so that the polyurethane finally obtained contains a total of from about 3 to 60, preferably from about 10 to 25% by weight of aromatic groups, based on the solid content. This may be achieved, for example, by using polyesters based on phthalic acid, isophthalic acid, terephthalic acid, naphthalene dicarboxylic acid or diphenyl carboxylic acid or polyethers based on bisphenol A or analogous aromatic hydroxyl compounds. All these starting components used for the synthesis of polyurethane dispersion A and B have been described in detail in the literature cited above.

The isocyanate components used for synthesizing the isocyanate prepolymers are generally the conventional diisocyanates used in polyurethane chemistry, e.g. hexamethylene diisocyanate, 1-isocyanato-3,3,5-trimethyl-5-isocyanato methyl-cyclohexane (hereinafter referred to as "isophorone diisocyanate"), 4,4'-diisocyanato-dicyclohexyl methane and its 4,2'- and 2,2'-isomers, 2,4-diisocyanato toluene, 2,6-diisocyanato toluene and mixtures thereof, and 4,4'-diisocyanato-diphenyl methane and its 4,2'- and 2,2'-isomers, aliphatic and cycloaliphatic diisocyanates being preferred. Monoisocyanates, e.g. stearyl isocyanate, may also be used in addition to the diisocyanates.

Whereas the type A dispersions should contain from about 5 to 100, preferably from about 8 to 40 (pseudo) milliequivalents of hydrophilic groups per about 100 g of solid content, as already mentioned above, the type B dispersions should contain from about 5 to 30, preferably from about 8 to 20 (pseudo) milliequivalents of hydrophilic groups per about 100 g of solid content.

By "pseudo milliequivalent" is meant, in the context of this invention, that quantity of ethylene oxide units in the polyurethane, preferably in a polyether side chain to the main chain of the polyurethane molecule, which corresponds in its hydrophilic character to 1 milliequivalent of ionic groups. According to this definition, 0.5% by weight of —$CH_2$—$CH_2$—O— units correspond to 1 "pseudo milliequivalent" in 100 g of polyurethane solids in the context of this invention.

The molecular weight of the polyurethane dispersed in water depends on the starting materials from which it has been synthesized and particularly on the method of preparation employed. If, for example, water-dispersible oligourethanes are prepared according to the process of German Published patent application 1,770,068 (U.S. Pat. No. 3,756,992), the molecular weight, $\overline{M}n$, will be below about 20,000, preferably from about 1,500 to 10,000. If, on the other hand, the process according to German Pat. No. 1,495,745 (U.S. Pat. No. 3,479,310) or German Published Patent Application 2,446,440 is employed, the molecular weight of the polyurethane is generally above about 20,000, preferably above about 50,000.

The type A and type B dispersions may be modified either separately or as mixtures in the aqueous phase with isocyanates, preferably diisocyanates, most preferably 1-isocyanato-3,3,5-trimethyl-5-isocyanato methyl cyclohexane, so that they become enveloped with urea. The isocyanate should react in such a manner that foaming due to excessive evolution of carbon dioxide does not occur. It is particularly preferred to modify the type B dispersions using this method.

To carry out this modification, the liquid or molten isocyanate (preferably in the absence of organic solvents) is added, with stirring, to the aqueous polyurethane dispersion at temperatures of from about 10 to 80° C., preferably at room temperature. The temperature may then be raised carefully so that foaming of the reaction mixture is avoided.

The quantity of isocyanate used in this modification process is generally from about 1 to 50% by weight, preferably less than about 15% by weight, based on the polyurethane solid content.

In addition to dispersions A and B, proportions of below about 50% by weight, preferably below about 20% by weight, based on the solid content, of other polyurethane dispersions of other polymer dispersions (e.g. based on styrene-butadiene copolymers, styrene-acrylonitrile copolymers, polyacrylic acid esters, poly-(meth)acrylates or PVC, optionally containing external emulsifiers) may also be used in the coating compositions according to the present invention.

The compositions according to the present invention contain the emulsifiers necessary for their dispersion in water in the form of chemically-fixed hydrophilic groups, as described above. Known eternal emulsifiers may, of course, also be added, in which case the amount of fixed emulsifiers may be reduced.

Additives commonly used in coatings, such as substances to improve texture, pigments, levelling agents and other auxiliaries may, of course, also be added to the coating compositions according to the present invention. The compositions may also contain solvents such as alcohols or ketones (preferably in quantities of less than about 5% by weight, based on the aqueous dispersion composition).

The coating compositions according to the present invention are particularly suitable for use as top coats or finishes for coating textiles with PVC. Three methods of applying the compositions according to the present invention are described below.

1. The dispersion composition according to the invention is applied (e.g. by knife-coating, spraying or printing) to a compact PVC layer which has been applied to a substrate such as a textile. The coating is generally dried at from about 70° to 190° C. in a heating channel. The artificial leather obtained in this way may then be machine embossed and is then rolled up.

2. The polyurethane dispersion composition is applied by knife-coating to a separating paper or some other substrate, e.g. a strip of steel sheet, and then dried in a heating channel. A degasified or foamed PVC paste is then applied to the dried PUR layer by knife-coating. The textile which is to be coated is then applied to the PVC paste. The PVC is gelled using a known method in a heating channel. After cooling, the separation paper or other substrate may be stripped off and the artificial leather rolled up.

3. The composition according to the invention is applied by knife-coating to a separating paper or some other substrate, e.g. a strip of steel sheet, and dried in a heating channel. A compact PVC paste containing chemical blowing agents such as azoisobutyric acid dinitrile or azodicarbonamide (see also F. Lober, Angew. Chem. 64,65 (1952); R. Reed, Plastics Progress 1955, 51; H. A. Scheurlen, Kunststoff 47, 446 (1957)) is applied by knife-coating to the dry PUR layer. A textile is laminated into the PVC paste and passed through a heating channel. The desired PVC foam is formed during the process of gelling. When the material has been cooled, generally to a temperature below about 80° C., the substrate is stripped off and the artificial leather obtained is rolled up.

While method 1 is a method of direct coating a composite PVC-textile material with a polyurethane dispersion composition, methods 2 and 3 are so-called reversal coatings. The thickness of the polyurethane top coat is in all cases about 5 to 100 g/m², preferably about 8 to 25 g/m².

Temperatures of around 170° to 200° C. are generally used for gelling PVC pastes. The melting point of a top coat on PVC should therefore be above about 200° C. PVC is a synthetic material which is extremely resistant to hydrolysis. The finish should therefore also be very stable to hydrolysis in order not to be more readily decomposed than the PVC. In this connection, it should be remembered that PVC releases small quantities of hydrochloric acid in the course of time, which deleteriously affect the resistance of the top coat to hydrolysis. The metal salts used in PVC to lower its gelling temperature (generally lead, cadmium or zinc compounds) are also liable to impair the resistance to hydrolysis.

One important criterion for a good PVC top coat is its relatively low swelling in commercial plasticizers for PVC. This depends to a large extent on the nature of the plasticizer (generally esters of phthalic acid, adipic acid, phosphoric acid or alkyl sulphonic acid with α-ethyl hexanol, n-butanol, benzyl alcohol, phenol and/or cresol). A slight degree of swelling of the top coat material in the plasticizer for PVC is presumably necessary in order to establish a firm bond on soft PVC, but the swelling of the finish should be as slight as possible in order to prevent migration of plasticizer to the surface.

It is surprisingly found that all these criteria are optimally fulfilled in the coating systems according to the present invention, whereas the individual components A or B used alone produce only very unsatisfactory results.

The finished coating produced according to the present invention may, of course, be embossed whenever desired, for example immediately after the drying or gelling process, or only after the coating has been in storage for a short or long period. In the reversal process, a surface structure can be imparted during the preparation of the coating by using an embossed separating paper or other substrate.

The following examples serve to illustrate the invention. The quantities given are parts by weight or percentages by weight unless otherwise indicated.

EXAMPLES

EXAMPLE 1

(1.1)—Dispersion Type A

Reaction mixture:
315 g hexane diol adipate
(OH-number 134)
9 g butane-1,4-diol
105 g hexamethylene diisocyanate
950 g acetone
23 g ethylene-diamino-2-ethane sulphonic acid sodium (45% in water; hereinafter referred to as "AAS-solution")
660 g salt-free water The polyester is dehydrated in a water jet vacuum at 110° C. for sixty minutes while it is stirred and then cooled to 80° C. The butane diol is stirred in over a period of 5 minutes and hexamethylene diisocyanate is then added. The reaction mixture is stirred at about 100° C. until it has an isocyanate content of 2.8%. Acetone is then added dropwise at 100° C. As soon as a homogeneous solution is obtained, the AAS-solution and 60 g of water are added and the mixture is stirred at 50° C. for 5 minutes. It is then dispersed in the remainder of the water and the acetone is removed by distillation. A sedimentation-resistant dispersion having a solid content of 40.2%, a Ford cup viscosity (4 mm nozzle) of 25 seconds and a pH value of 6.8 is obtained.

A film formed from this dispersion has a hardness degree of 90 Shore A and a softening point of 160° C.

(1.2)—Dispersion Type B

Reaction mixture:
570 g of a polypropylene glycol polyether (OH-number 197) started on bisphenol A
90 g of a propoxylated adduct of 2-butene diol-(1,4) and $NaHSO_3$ (OH-number 261)
309 g hexamethylene diisocyanate
75 g urea
2380 g salt-free water
170 g formaldehyde (30% in water)
76 g isophorone diisocyanate The polyether and the adduct are dehydrated in a water jet vacuum at 110° C. for one hour while they are stirred and then cooled to 70° C. The diisocyanate is then added and the reaction mixture stirred at 80° C. until it has an isocyanate content of 5.5%. Urea is then added and the mixture is heated to 125° C. and stirred. As soon as the melt is free from isocyanate, it is cooled to 100° C. and water (preheated to 80° C.) is stirred in. After about one hour's further stirring, formaldehyde is added and the mixture is stirred for about one hour at 70° C. When the dispersion has cooled to room temperature, the isophorone diisocyanate is stirred in. The dispersion is slowly heated to 90° C., taking care to ensure that evolution of $CO_2$ does not lead to vigorous foaming.

The resulting dispersion $B_1$ has a solid content of 29.4%, a Ford cup viscosity (4 mm nozzle) of 12.2 seconds and a pH value of 6.2. The dispersion shows a Tyndall effect in transmitted light. The solid content contains 17.8 milliequivalent percent of $SO_3^\ominus$-groups.

The film formed from dispersion $B_1$ has a hardness degree of approximately 55 Shore D, a melting point of about 230° C. and a tensile strength after 6 weeks hydrolytic ageing at 70° C. and 95% relative humidity (the so-called Tropical test) equal to 100% of the original tensile strength. The volumetric swelling after seven day's storage at room temperature in PVC plasticizers based on phthalic acid esters is less than 10 volume %.

Dispersion $B_2$ is a modification of dispersion $B_1$. The difference lies in the fact that the after-treatment of the PUR-dispersion with isophorone diisocyanate in an aqueous bath is dispensed with. The film thus obtained has a hardness of 54 Shore D and a softening point of about 230° C. and its tensile strength after 6 week's subjection to the Tropical test is still very satisfactory, amounting to about 18% of the initial tensile strength. The swelling in plasticizer is almost as slight as in the case of dispersion B, which has been after-treated with diisocyanate (see Table I).

(1.3)—Preparation of a finish on PVC

The individual dispersions A and B or mixtures thereof (in proportions of A:B=2:8) together with an acrylic acid thickener are applied to a normal separating paper (e.g. ® Stripcote VEM CIS of S. D. Warren) by means of a doctor roller with an integral coating knife so that the film obtained has a thickness of 1.5 g/m² after drying at from 80° to 150° C. The following formulations are used as finishes:

(a)—(Comparison)
100 parts by weight 40% PUR-dispersion A
1 part by weight polyacrylic acid thickener
5 parts by weight aqueous pigment preparation adjusted to pH 8 using ammonia.

(b)—(Comparison)
100 parts by weight 30% PUR-dispersion $B_1$ or $B_2$
2.5 parts by weight polyacrylic acid thickener
5 parts by weight aqueous pigment preparation adjusted to pH 8 using ammonia.

(c)—(According to the invention)
20 parts by weight of 40% PUR-dispersion A
80 parts by weight 30% PUR-dispersion B
2.5 parts by weight polyacrylic acid thickener
5 parts by weight aqueous pigment preparation adjusted to pH 8 using ammonia.

A PVC foam coating of the following composition is applied to each of the completely heat-treated finishes:

55 parts by weight of a PVC plastisol (e.g. (® Solvic 336)
9 parts by weight of plasticizer dioctyl phthalate
36 parts by weight of plasticizer didecyl phthalate
10 parts by weight chalk
1 part by weight $SiO_2$-powder
1 part by weight azoisobutyric acid dinitrile
1 part by weight Cd/Zn-stearate
5 parts by weight iron oxide yellow pigment.

The PVC paste which is to be expanded into a foam is laminated to a cotton fabric in an application of 200 g/m² and heated at 190° C. for 1.5 minutes. It is then cooled and separated from the paper.

When dispersion A is used alone (Experiment (a)), the coating obtained has a sticky surface permeated by a disturbing quantity of plasticizer from the PVC paste, but it adheres firmly to the PVC.

When dispersions $B_1$ and $B_2$ are used alone as top coats (Experiment (b)) in the reversal process, the coating obtained has a very dry, non-blocking, pleasant feel with very little migration of plasticizer, but its adherence to PVC is poor, i.e. the layers can easily be removed by slight scratching with a fingernail.

Coatings which are satisfactory in every respect are obtained when using the dispersion mixture (Experiment (c)).

the following Table demonstrates the properties of the top film and its adherence to the PVC foam.

TABLE I

| Finish from | Softening Point | Swelling after 7 days storage in % dodecyl phthalate (vol. %) | % dioctyl phthalate (vol. %) | Tear resistance after X week's subjection to the Tropical test | Adherence to PVC | Surface feel in direct coating | Surface feel in reversal process |
|---|---|---|---|---|---|---|---|
| Dispersion |  |  |  |  |  |  |  |
| A | 160° C. | 19 | 19 | 18%/4 weeks | good | blocking | sticky |
| $B_1$ | 230° C. | 6 | 6 | 100%/6 weeks | unsatisfactory | dry, hard | dry, hard |
| $B_2$ | 230° C. | 7 | 7 | 81%/6 weeks | unsatisfactory | dry, hard | dry, hard |
| Mixture (A:$B_1$ = 2:8) | 230° C. | 19 | 19 | 83%/6 weeks | good | dry, flexible | dry, flexible |
| (A:$B_2$ = 2:8) | 230° C. | 19 | 19 | 73%/6 weeks | good | dry, flexible | dry, flexible |

EXAMPLE 2

(2.1)—Dispersion Type A

Reaction mixture:
225 g butane diol polyadipate (OH-number 50)
14.4 g of an adduct of $NaHSO_3$—with propoxylated butene diol (OH-number 258; 80% in toluene)
31.1 g tolylene diisocyanate (65% 2,4- and 35% 2,6-isomer)
405 g salt-free water
20.9 g AAS-solution.

The polyester and the adduct are dehydrated in a water jet vacuum at 110° C. while they are stirred, and then cooled to 60° C. The diisocyanate is added with cooling and the reaction mixture is stirred at 60° C. until it has an isocyanate content of 1.85%. The mixture of water and AAS-solution preheated to 40° C. is then added and the reaction mixture is stirred for a further two hours while slowly cooled to room temperature.

The solid content of the sedimentation-resistant dispersion is 39.0%, the Ford cup outflow time (4 mm nozzle) 35.7 seconds and the pH value 6.5. The dispersion contains 27.4 milliequivalents of $SO_3^{(-)}$—groups in 100 g of polyurethane solids.

A film of the dispersion has a hardness degree of 90 Shore A.

said dispersion is carried out by means of a doctor roller to produce a layer having a solid content of 15 g/m² which is then heated according to Example 1.3.

The film properties of the various finishes and an assessment of the surface texture and adherence to PVC are summarized in the Table below.

TABLE III

| Finish obtained from | Softening point | Swelling in dioctyl phthalate after 7 day's storage (Vol. %) | Tear resistance after X week's subjection to the Tropical test | Surface texture by direct coating process | Adherence to PVC |
| --- | --- | --- | --- | --- | --- |
| Dispersion A | 180° C. | 19 | 0/2 weeks | blocking | good |
| Mixture (A:B$_1$ = 1:9) | 230° C. | 6 | 80%/6 weeks | dry, less hard | satisfactory |
| Mixture (A:B$_1$ = 2:8) | 230° C. | 13 | 54%/6 weeks | dry, elastic | good |

Dispersion A (alone or mixed with dispersion B$_1$ from Example 1.2) is used as a finish analogously to Example 1.3. The following Table again shows the advantage of using a mixture of A and B, since dispersion A used alone results in a sticky coating.

TABLE II

| Finish obtained from | Softening Point | Adherence to PVC | Surface texture by | |
| --- | --- | --- | --- | --- |
| | | | Direct coating | Reversal process |
| Dispersion A | 160° C. | good | Blocking | Sticky |
| Mixture (A:B$_1$ = 2:8) | 230° C. | good | Dry, elastic | Dry, elastic |

EXAMPLE 3

(3.1)—Dispersion Type A

Reaction mixture:
500 g neopentyl glycol-hexane diol-polyadipate (OH-number 66)
83 g hexamethylene diisocyanate
32 g AAS-solution
900 g salt-free water
1200 g acetone.

The polyester is dehydrated in a water jet vacuum at 110° C. while it is stirred for 30 minutes. It is then cooled to 80° C. and the diisocyanate is added. The mixture is left to react at 100° C. until it has an isocyanate content of 2.85%. Acetone is then added. As soon as homogeneous solution is obtained, the isocyanate prepolymer is mixed with AAS-solution. Five minutes after the addition of the amine, the polyurethane is precipitated with water to form a dispersion. Acetone is then distilled off until the acetone content is below 1%.

The solid content of the dispersion is 40.1%, the Ford cup outflow time (4 mm nozzle) 24 seconds and the pH value 6.6. The dispersion shows a Tyndall effect in transmitted light.

A film formed from dispersion A has a Shore A hardness of 60 and a softening point of 180° C. For other properties of the film see Table III. The surface texture is rubbery and blocking.

The dispersion thickened as described in Example 1.3 (A alone or as a mixture with B$_1$ from Example 1.2) is applied to a completely set PVC foam which has been produced from the formulation of Example 1.3 and bonded to a textile substrate. Application of the aforesaid dispersion is carried out by means of a doctor roller to produce a layer having a solid content of 15 g/m² which is then heated according to Example 1.3.

Dispersion A could not be treated with PVC by the reversal process in spite of its good adherence to PVC because the film would not withstand the gelling temperatures of the PVC plastisol. The mixtures of A and B satisfy all requirements.

EXAMPLE 4

(4.1)—Dispersion Type A

Reaction mixture:
1000 g butane diol-polyadipate (OH-number 50)
380 g of a polypropylene glycol polyether started on bisphenol A (OH-number 197)
76 g dispersing agent A
417.9 g hexamethylene diisocyanate
159.4 g isophorone diamine (IPDA)
33.4 g AAS-solution
2190 g acetone
3125 g salt-free water.

To prepare dispersing agent, A, N,N-diethanolamine is chemically added to the product obtained from the reaction of hexamethylene diisocyanate with a polyethylene oxide polyether which has been started on butanol and contains about 17% of polypropylene oxide groups (NCO/OH=2) (NCO/NH of addition product=1). The molecular weight, $\overline{M}n$, of dispersing agent A is 2250. The ethylene oxide content is about 77% by weight.

A mixture of polyester, polyether and dispersing agent A is dehydrated in a water jet vacuum at 110° C. for one hour while it is stirred and then cooled to 70° C. The diisocyanate is then added and the reaction mixture stirred at 100° C. until it has an isocyanate content of 6.0%. Acetone is then stirred in. As soon as the solution is homogeneous, the isocyanate prepolymer is lengthened using the AAS-solution and IPDA. Five minutes after the addition of the amine, the polyurethane is precipitated with water to form a dispersion. Acetone is then distilled off until the acetone content is below 1%.

The solid content of the sedimentation-resistant dispersion is 41.1%, the Ford cup outflow time (4 mm nozzle) 22.3 seconds and the pH value 6.5.

the softening point of a film of dispersion A is 185° C., the Shore A hardness 81.

(4.2)—Dispersion Type B

Reaction mixture:

200 g of a polyester of ethylene glycol and phthalic acid (OH-number 56)
58 g of a polyester of phthalic acid/adipic acid and ethylene glycol (OH-number 64)
43 g hexamethylene diisocyanate
22 g AAS-solution
470 g salt-free water
600 g acetone
16 g isophorone diisocyanate (IPDI).

A mixture of the polyesters is dehydrated in a water jet vacuum at 110° C. while it is stirred for 30 minutes, and cooled to 70° C. The diisocyanate is then added and the melt stirred at 90° C. until it has an isocyanate content of 3.4%. The melt is then diluted with acetone under conditions of cooling to 50° C. As soon as a homogeneous solution is obtained, the isocyanate prepolymer is lengthened using the AAS-solution. Five minutes after the addition of the amine, the polyurethane is precipitated with water to form a dispersion. Acetone is then distilled off until the acetone content is below 1% by weight. IPDI is then added at room temperature. The dispersion is slowly heated to 90° C., care being taken to ensure that evolution of $CO_2$ does not lead to vigorous foaming. The dispersion is free from isocyanate groups after 4 hours. The dispersion, which is resistant to centrifuging (15 minutes at 3500 revs. per min.) has a solid content of 41.1%, a Ford cup outflow time (4 mm nozzle) of 18.3 seconds and a pH value of 6.

A film formed from this dispersion has a Shore D hardness of approximately 52, a softening point of 215° C., and adheres poorly to PVC foam.

(4.3)—Coating of PVC

Dispersions A and B and a mixture thereof in proportions by weight of 2:8 are used in finishes for coating PVC as in Example 1.3.

The following Table shows the various softening points, film strengths after ageing, and adherence of the finishes to PVC.

TABLE IV

| Finish obtained from | Softening point | Tear resistance after X week's subjection to the Tropical test | Adherence to PVC | Surface texture by Direct Coating | Surface texture by Reversal Process |
|---|---|---|---|---|---|
| Dispersion A | 185° C. | 34%/6 weeks | good | dry, elastic | sticky, elastic |
| Dispersion B | 215° C. | 93%/6 weeks | unsatisfactory | dry, hard | dry, hard |
| Mixture (A:B = 2:8) | 215° C. | 80%/6 weeks | good | dry, elastic | dry, elastic |

Dispersion A has little resistance to hydrolysis in spite of its high softening point and firm adherence to PVC. Dispersion B does not adhere to PVC.

The mixture of the two dispersions fulfills all the requirements, such as high softening point, high resistance to hydrolysis, firm adherence to PVC and dry, elastic texture.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Coating compositions based on aqueous polyurethane dispersions which are resistant to sedimentation and have a solid content below about 60% by weight, characterized in that they contain, based on the polyurethane solid content:
    (A) from about 2 to 90% by weight of a polyurethane which:
        (a) contains from about 5 to 100 milliequivalents or pseudo milliequivalents of anionic groups, cationic groups or ethylene oxide units or mixtures thereof in 100 g of polyurethane solids and
        (b) at least about 4% by weight, based on the solid content, of linear alkylene groups having from about 4 to 6 carbon atoms, which polyurethane results in films which
        (c) have a softening point below about 250° C. and
        (d) a Shore A hardness below about 97; and
    (B) from about 10 to 98% by weight of a polyurethane which:
        (a) contains from about 5 to 30 milliequivalents or pseudo milliequivalents of anionic groups, cationic groups or ethylene oxide sequences or mixtures thereof in 100 g of polyurethane solids and forms films which
        (b) soften above about 210° C. and
        (c) have a Shore D hardness above about 50.

2. The coating compositions of claim 1, characterized in that they contain
    (A) from about 5 to 50% by weight, based on the polyurethane solid content, of a polyurethane which:
        (a) contains from about 8 to 40 milliequivalents or pseudo milliequivalents of anionic groups, cationic groups or ethylene oxide units, or mixtures thereof in 100 g of polyurethane solids and
        (b) from about 10 to 65% by weight, based on the solid content, of linear alkylene groups having from about 4 to 6 carbon atoms, which polyurethane forms films which
        (c) have a softening point below about 190° C. and
        (d) have a Shore A hardness of from about 30 to 95; and
    (B) from about 50 to 95% by weight, based on the polyurethane solid content, of a polyurethane which:
        (a) contains from about 8 to 20 milliequivalents or pseudo milliequivalents of anionic groups, cationic groups or ethylene oxide sequences or mixtures thereof in 100 g polyurethane solids and forms films which
        (b) soften above about 215° C. and
        (c) have a Shore D hardness above about 55.

3. The coating compositions of either claims 1 or 2 wherein component B has a molecular weight, $\overline{M}n$, below about 1,000 and is a polyurethane based on polyesters, polyethers or polyesters and polyethers which contain aromatic rings.

4. The coating compositions of claim 3, wherein component B is a polyurethane containing from about 3 to 60% by weight of aromatic rings.

5. The coating compositions of either claims 1 or 2, wherein component A, component B or mixtures of component A and component B have been modified with from about 1 to 50% by weight, based on the solid content of the component(s) used, of isocyanates.

6. The coating compositions of claim 5, wherein the isocyanate is 1-isocyanato-3,3,5-trimethyl-5-isocyanato methylcyclohexane.

7. In a process for the direct or reversal coating of homogeneous or foamed PVC with polyurethanes and allowing said coated article to dry, the improvement comprising using, as the coating agents, coating compositions based on aqueous polyurethane dispersions which are resistant to sedimentation and have a solid content below about 60% by weight, characterized in that they contain, based on the polyurethane solid content:

(A) from about 2 to 90% by weight of a polyurethane which:
  (a) contains from about 5 to 100 milliequivalents or pseudo milliequivalents of anionic groups, cationic groups or ethylene oxide units or mixtures thereof in 100 g of polyurethane solids and
  (b) at least about 4% by weight, based on the solid content, of linear alkylene groups having from about 4 to 6 carbon atoms, which polyurethane results in films which
  (c) have a softening point below about 205° C. and
a Shore A hardness below about 97; and
(B) from about 10 to 98% of weight of a polyurethane which:
  (a) contains from about 5 to 30 milliequivalents or pseudo milliequivalents of anionic groups, cationic groups or ethylene oxide sequences or mixtures thereof in 100 g of polyurethane solids and forms films which
  (b) soften above about 210° C. and
  (c) have a Shore D hardness above about 50.

* * * * *

UNITED STATES PATENT AND TRADEMARK OFFICE
CERTIFICATE OF CORRECTION

PATENT NO. : 4,206,255

DATED : June 3, 1980

INVENTOR(S) : Wolfgang Wenzel, Walter Schröer, Manfred Preuss, Hans-Joachim Koch It is certified that error appears in the above-identified patent and that said Letters Patent are hereby corrected as shown below:

In the identification of the inventors [75] on the title page, please identify the second inventor by his full name, i.e., --Walter Schröer--.

Column 4, line 39, correct "of" to --or--.

Column 7, line 16, please correct "18%" to read --81%--.

Column 12, Claim 1, line 16, please correct "250°C" to --205°C--

Column 14, Claim 7, line 14, before "a Shore A hardness", insert --(d)--.

Signed and Sealed this

Eighteenth Day of November 1980

[SEAL]

Attest:

SIDNEY A. DIAMOND

Attesting Officer

Commissioner of Patents and Trademarks